(12) United States Patent
Park et al.

(10) Patent No.: US 7,675,828 B2
(45) Date of Patent: Mar. 9, 2010

(54) RECORDING MEDIUM HAVING DATA STRUCTURE FOR MANAGING AT LEAST A DATA AREA OF THE RECORDING MEDIUM AND RECORDING AND REPRODUCING METHODS AND APPARATUSES

(75) Inventors: Yong Cheol Park, Gwachon-si (KR); Sung Dae Kim, Gunpo-si (KR)

(73) Assignee: LG Electronics Inc., Seoul (KR)

( * ) Notice: Subject to any disclaimer, the term of this patent is extended or adjusted under 35 U.S.C. 154(b) by 662 days.

(21) Appl. No.: 10/784,817

(22) Filed: Feb. 24, 2004

(65) Prior Publication Data

US 2004/0165496 A1   Aug. 26, 2004

(30) Foreign Application Priority Data

Feb. 25, 2003   (KR) .................... 10-2003-0011829
Feb. 25, 2003   (KR) .................... 10-2003-0011830
Mar. 13, 2003   (KR) .................... 10-2003-0015634

(51) Int. Cl.
*G11B 7/004*   (2006.01)

(52) U.S. Cl. ................ 369/53.17; 369/47.14
(58) Field of Classification Search ............. 369/47.14, 369/53.17, 53.15, 44.32, 44.33, 30.21, 30.24, 369/30.36, 275.3; 714/48
See application file for complete search history.

(56) References Cited

U.S. PATENT DOCUMENTS

| | | |
|---|---|---|
| 4,558,446 A | 12/1985 | Banba et al. |
| 4,733,386 A | 3/1988 | Shimoi |
| 4,807,205 A | 2/1989 | Picard |
| 4,963,866 A | 10/1990 | Duncan |
| 5,068,842 A | 11/1991 | Naito |
| 5,111,444 A | 5/1992 | Fukushima et al. |
| 5,210,734 A | 5/1993 | Sakurai |
| 5,235,585 A | 8/1993 | Bish et al. |
| 5,237,553 A | 8/1993 | Fukushima et al. |
| 5,247,494 A | 9/1993 | Ohmo et al. |
| 5,319,626 A | 6/1994 | Ozaki et al. |
| 5,404,357 A | 4/1995 | Ito et al. |
| 5,442,611 A | 8/1995 | Hosaka |
| 5,448,728 A | 9/1995 | Takano et al. |
| 5,475,820 A | 12/1995 | Natrasevschi et al. |
| 5,481,519 A | 1/1996 | Hosoya |

(Continued)

FOREIGN PATENT DOCUMENTS

CN   1134017   10/1996

(Continued)

OTHER PUBLICATIONS

Taiwanese Office Action, dated Apr. 4, 2006.

(Continued)

*Primary Examiner*—Wayne R Young
*Assistant Examiner*—Thomas D Alunkal
(74) *Attorney, Agent, or Firm*—Harness, Dickey & Pierce

(57) ABSTRACT

The data structure on the recording medium includes a temporary defect management area storing a data block. The data block includes a space bit map and a temporary definition structure. The space bit map indicates recordation status of the data area, and the temporary definition structure provides a pointer to the space bit map.

21 Claims, 7 Drawing Sheets

U.S. PATENT DOCUMENTS

| | | |
|---|---|---|
| 5,495,466 A | 2/1996 | Dohmeier et al. |
| 5,528,571 A | 6/1996 | Funahashi et al. |
| 5,553,045 A | 9/1996 | Obata |
| 5,577,194 A | 11/1996 | Wells et al. |
| 5,608,715 A | 3/1997 | Yokogawa et al. |
| 5,715,221 A | 2/1998 | Ito et al. |
| 5,720,030 A | 2/1998 | Kamihara et al. |
| 5,740,435 A | 4/1998 | Yamamoto et al. |
| 5,745,444 A | 4/1998 | Ichikawa et al. |
| 5,799,212 A | 8/1998 | Ohmori |
| 5,802,028 A | 9/1998 | Igarashi |
| 5,805,536 A | 9/1998 | Gage et al. |
| 5,848,038 A | 12/1998 | Igarashi |
| 5,867,455 A | 2/1999 | Miyamoto et al. |
| 5,878,020 A | 3/1999 | Takahashi |
| 5,914,928 A * | 6/1999 | Takahashi ................ 369/47.14 |
| 6,058,085 A | 5/2000 | Obata |
| 6,118,608 A | 9/2000 | Kakihara et al. |
| 6,138,203 A | 10/2000 | Inokuchi et al. |
| 6,160,778 A * | 12/2000 | Ito et al. .................. 369/53.15 |
| 6,189,118 B1 | 2/2001 | Sasaki et al. |
| 6,233,654 B1 | 5/2001 | Aoki et al. |
| 6,292,445 B1 | 9/2001 | Ito et al. |
| 6,341,109 B1 | 1/2002 | Kayanuma |
| 6,341,278 B1 | 1/2002 | Yamamoto et al. |
| 6,373,800 B1 | 4/2002 | Takahashi |
| 6,405,332 B1 | 6/2002 | Bando et al. |
| 6,414,923 B1 | 7/2002 | Park et al. |
| 6,447,126 B1 | 9/2002 | Hornbeck |
| 6,466,532 B1 | 10/2002 | Ko |
| 6,469,978 B1 * | 10/2002 | Ohata et al. .............. 369/275.3 |
| 6,477,126 B1 | 11/2002 | Park et al. |
| 6,480,446 B1 | 11/2002 | Ko |
| 6,493,301 B1 | 12/2002 | Park |
| 6,529,458 B1 | 3/2003 | Shin |
| 6,542,450 B1 | 4/2003 | Park |
| 6,564,345 B1 | 5/2003 | Kim et al. |
| 6,581,167 B1 * | 6/2003 | Gotoh et al. .................... 714/7 |
| 6,594,209 B2 | 7/2003 | Ijtsma et al. |
| 6,606,285 B1 * | 8/2003 | Ijtsma et al. ............... 369/47.1 |
| 6,615,363 B1 | 9/2003 | Fukasawa |
| 6,631,106 B1 | 10/2003 | Numata et al. |
| 6,633,724 B1 | 10/2003 | Hasegawa et al. |
| 6,667,939 B1 | 12/2003 | Miyamoto |
| 6,671,249 B2 | 12/2003 | Horie |
| 6,697,306 B2 | 2/2004 | Sako |
| 6,714,502 B2 | 3/2004 | Ko et al. |
| 6,724,701 B2 | 4/2004 | Ijtsma et al. |
| 6,738,341 B2 | 5/2004 | Ohata et al. |
| 6,754,860 B2 | 6/2004 | Kim et al. |
| 6,760,288 B2 | 7/2004 | Ijtsma et al. |
| 6,763,429 B1 | 7/2004 | Hirayama |
| 6,766,418 B1 | 7/2004 | Alexander et al. |
| 6,788,631 B1 | 9/2004 | Park et al. |
| 6,795,389 B1 | 9/2004 | Nishiuchi et al. |
| 6,804,797 B2 | 10/2004 | Ko et al. |
| 6,826,140 B2 | 11/2004 | Brommer et al. |
| 6,842,580 B1 | 1/2005 | Ueda et al. |
| 6,845,069 B2 | 1/2005 | Nakahara et al. |
| 6,883,111 B2 | 4/2005 | Yoshida et al. |
| 6,918,003 B2 | 7/2005 | Sasaki |
| 6,922,802 B2 | 7/2005 | Kim et al. |
| 6,934,236 B2 | 8/2005 | Lee et al. |
| 6,999,398 B2 | 2/2006 | Yamamoto et al. |
| 7,002,882 B2 | 2/2006 | Takahashi |
| 7,027,059 B2 | 4/2006 | Hux et al. |
| 7,027,373 B2 | 4/2006 | Ueda et al. |
| 7,042,825 B2 | 5/2006 | Yamamoto et al. |
| 7,050,701 B1 | 5/2006 | Sasaki et al. |
| 7,092,334 B2 | 8/2006 | Choi et al. |
| 7,123,556 B2 | 10/2006 | Ueda et al. |
| 7,149,930 B2 | 12/2006 | Ogawa et al. |
| 7,161,879 B2 | 1/2007 | Hwang et al. |
| 7,184,377 B2 | 2/2007 | Ito et al. |
| 7,188,271 B2 | 3/2007 | Park et al. |
| 7,233,550 B2 | 6/2007 | Park et al. |
| 7,236,687 B2 | 6/2007 | Kato et al. |
| 7,272,086 B2 | 9/2007 | Hwang et al. |
| 7,289,404 B2 | 10/2007 | Park et al. |
| 7,296,178 B2 | 11/2007 | Yoshida et al. |
| 7,313,066 B2 | 12/2007 | Hwang et al. |
| 7,327,654 B2 | 2/2008 | Hwang et al. |
| 7,379,402 B2 | 5/2008 | Ko et al. |
| 2001/0009537 A1 | 7/2001 | Park |
| 2001/0011267 A1 | 8/2001 | Kihara et al. |
| 2001/0025138 A1 | 9/2001 | Bardy |
| 2001/0026511 A1 * | 10/2001 | Ueda et al. ................ 369/47.14 |
| 2001/0043525 A1 | 11/2001 | Ito et al. |
| 2001/0043800 A1 * | 11/2001 | Gotoh et al. ................. 386/111 |
| 2002/0097665 A1 | 7/2002 | Ko et al. |
| 2002/0097666 A1 | 7/2002 | Ko et al. |
| 2002/0099950 A1 | 7/2002 | Smith |
| 2002/0136118 A1 * | 9/2002 | Takahashi ................ 369/47.14 |
| 2002/0136134 A1 | 9/2002 | Ito et al. |
| 2002/0136537 A1 | 9/2002 | Takahashi |
| 2002/0159382 A1 | 10/2002 | Ohata et al. |
| 2002/0161774 A1 | 10/2002 | Tol et al. |
| 2002/0176341 A1 | 11/2002 | Ko et al. |
| 2003/0072236 A1 | 4/2003 | Hirotsune et al. |
| 2003/0095482 A1 | 5/2003 | Hung et al. |
| 2003/0126527 A1 | 7/2003 | Kim et al. |
| 2003/0135800 A1 | 7/2003 | Kim et al. |
| 2003/0137909 A1 | 7/2003 | Ito et al. |
| 2003/0137910 A1 | 7/2003 | Ueda et al. |
| 2003/0142608 A1 | 7/2003 | Yamamoto et al. |
| 2003/0149918 A1 | 8/2003 | Takaichi |
| 2003/0173669 A1 | 9/2003 | Shau |
| 2003/0198155 A1 | 10/2003 | Go et al. |
| 2004/0001408 A1 | 1/2004 | Propps et al. |
| 2004/0004917 A1 | 1/2004 | Lee |
| 2004/0062159 A1 | 4/2004 | Park et al. |
| 2004/0062160 A1 | 4/2004 | Park et al. |
| 2004/0076096 A1 * | 4/2004 | Hwang et al. ............ 369/53.21 |
| 2004/0105363 A1 | 6/2004 | Ko et al. |
| 2004/0114474 A1 | 6/2004 | Park et al. |
| 2004/0120233 A1 | 6/2004 | Park et al. |
| 2004/0125716 A1 | 7/2004 | Ko et al. |
| 2004/0125717 A1 | 7/2004 | Ko et al. |
| 2004/0136292 A1 | 7/2004 | Park et al. |
| 2004/0145980 A1 | 7/2004 | Park et al. |
| 2004/0158768 A1 | 8/2004 | Park et al. |
| 2004/0174782 A1 | 9/2004 | Lee et al. |
| 2004/0174785 A1 | 9/2004 | Ueda et al. |
| 2004/0179445 A1 | 9/2004 | Park et al. |
| 2004/0179458 A1 | 9/2004 | Hwang et al. |
| 2004/0223427 A1 | 11/2004 | Kim et al. |
| 2004/0246851 A1 | 12/2004 | Hwang et al. |
| 2005/0007910 A1 | 1/2005 | Ito et al. |
| 2005/0008346 A1 | 1/2005 | Noguchi et al. |
| 2005/0025007 A1 | 2/2005 | Park |
| 2005/0047294 A1 | 3/2005 | Park |
| 2005/0050402 A1 | 3/2005 | Koda et al. |
| 2005/0052972 A1 | 3/2005 | Park |
| 2005/0052973 A1 | 3/2005 | Park |
| 2005/0055500 A1 | 3/2005 | Park |
| 2005/0060489 A1 | 3/2005 | Park |
| 2005/0068877 A1 | 3/2005 | Yeo |
| 2005/0083740 A1 | 4/2005 | Kobayashi |
| 2005/0083767 A1 | 4/2005 | Terada et al. |
| 2005/0083830 A1 | 4/2005 | Martens et al. |
| 2005/0195716 A1 | 9/2005 | Ko et al. |
| 2005/0207262 A1 | 9/2005 | Terada et al. |
| 2005/0289389 A1 | 12/2005 | Yamagami et al. |
| 2006/0077827 A1 | 4/2006 | Takahashi |

| | | | |
|---|---|---|---|
| 2006/0195719 A1 | 8/2006 | Ueda et al. | |
| 2006/0203635 A1 | 9/2006 | Ko et al. | |
| 2006/0203638 A1 | 9/2006 | Ko et al. | |
| 2006/0203684 A1 | 9/2006 | Ko et al. | |
| 2006/0227694 A1 | 10/2006 | Woerlee et al. | |
| 2007/0294571 A1 | 12/2007 | Park et al. | |
| 2008/0046780 A1 | 2/2008 | Shibuya et al. | |

FOREIGN PATENT DOCUMENTS

| | | |
|---|---|---|
| CN | 1140897 | 1/1997 |
| CN | 1227950 | 9/1999 |
| CN | 1273419 | 11/2000 |
| CN | 1675708 | 9/2005 |
| CN | 1685426 | 10/2005 |
| DK | 199 54 054 | 6/2000 |
| EP | 0 314 186 | 5/1989 |
| EP | 0 325 823 | 8/1989 |
| EP | 0 350 920 | 1/1990 |
| EP | 0 464 811 A2 | 1/1992 |
| EP | 0 472 484 | 2/1992 |
| EP | 0 477 503 | 4/1992 |
| EP | 0 556 046 | 8/1993 |
| EP | 0 871 172 | 10/1998 |
| EP | 0908882 | 4/1999 |
| EP | O 974 967 | 1/2000 |
| EP | 0 989 554 | 3/2000 |
| EP | 0 997 904 | 5/2000 |
| EP | 1 043 723 | 10/2000 |
| EP | 1 132 914 | 9/2001 |
| EP | 1 148 493 | 10/2001 |
| EP | 1 152 414 | 11/2001 |
| EP | 1 026 681 B1 | 9/2002 |
| EP | 1 239 478 | 9/2002 |
| EP | 1 274 081 | 1/2003 |
| EP | 1 298 659 | 4/2003 |
| EP | 1 329 888 | 7/2003 |
| EP | 1 347 452 | 9/2003 |
| EP | 1 564 740 | 8/2005 |
| EP | 1612790 | 1/2006 |
| GB | 2 356 735 | 5/2001 |
| JP | 63-091842 | 4/1988 |
| JP | 1-263955 | 10/1989 |
| JP | 2-023417 | 1/1990 |
| JP | 4-172662 | 6/1992 |
| JP | 5-274814 | 10/1993 |
| JP | 6-349201 | 12/1994 |
| JP | 8-050766 | 2/1996 |
| JP | 8-096522 | 4/1996 |
| JP | 9-145634 | 6/1997 |
| JP | 9-231053 | 9/1997 |
| JP | 10-050005 | 2/1998 |
| JP | 10-050032 | 2/1998 |
| JP | 10-187356 | 7/1998 |
| JP | 10-187357 | 7/1998 |
| JP | 10-187358 | 7/1998 |
| JP | 10-187359 | 7/1998 |
| JP | 10-187360 | 7/1998 |
| JP | 10-187361 | 7/1998 |
| JP | 11-086418 | 3/1999 |
| JP | 11-086436 | 3/1999 |
| JP | 11-110888 | 4/1999 |
| JP | 11-203792 | 7/1999 |
| JP | 2000-090588 | 3/2000 |
| JP | 2000-149449 | 5/2000 |
| JP | 2000-195178 | 7/2000 |
| JP | 2000-215612 | 8/2000 |
| JP | 2000-285607 | 10/2000 |
| JP | 2001-023317 | 1/2001 |
| JP | 2001-069440 | 3/2001 |
| JP | 2001-110168 | 4/2001 |
| JP | 2001-351334 | 12/2001 |
| JP | 2001-357623 | 12/2001 |
| JP | 2002-015507 | 1/2002 |
| JP | 2002-015525 | 1/2002 |
| JP | 2002-056619 | 2/2002 |
| JP | 2002-157832 | 5/2002 |
| JP | 2002-215612 | 8/2002 |
| JP | 2002-288938 | 10/2002 |
| JP | 2002-329321 | 11/2002 |
| JP | 2002-352522 | 12/2002 |
| JP | 2004-280864 | 10/2004 |
| JP | 2004-280865 | 10/2004 |
| JP | 2005-004912 | 1/2005 |
| JP | 2005-056542 | 3/2005 |
| JP | 2005-535993 | 11/2005 |
| JP | 2005-538490 | 12/2005 |
| JP | 2005-538491 | 12/2005 |
| JP | 2006-519445 | 8/2006 |
| KR | 10-2004-0015602 | 11/2004 |
| TW | 371752 | 10/1999 |
| TW | 413805 | 12/2000 |
| WO | WO 84/00628 | 2/1984 |
| WO | WO 96/30902 | 10/1996 |
| WO | WO 97/22182 | 6/1997 |
| WO | WO 00/54274 | 9/2000 |
| WO | WO 01/22416 | 3/2001 |
| WO | WO 01/93035 | 12/2001 |
| WO | WO 01/95330 | 12/2001 |
| WO | WO 03/007296 | 1/2003 |
| WO | WO 03/025924 | 3/2003 |
| WO | WO 03/079353 | 9/2003 |
| WO | 2007/015708 | 2/2004 |
| WO | WO 2004/015707 | 2/2004 |
| WO | WO 2004/015708 | 2/2004 |
| WO | WO 2004/025648 | 3/2004 |
| WO | WO 2004/025649 | 3/2004 |
| WO | WO 2004/029668 | 4/2004 |
| WO | WO 2004/029941 | 4/2004 |
| WO | WO 2004/034396 | 4/2004 |
| WO | WO 2004/036561 | 4/2004 |
| WO | WO 2004/053872 | 6/2004 |
| WO | WO 2004/053874 | 6/2004 |
| WO | WO 2004/059648 | 7/2004 |
| WO | WO 2004/068476 | 8/2004 |
| WO | WO 2004/075180 | 9/2004 |
| WO | WO 2004/079631 | 9/2004 |
| WO | WO 2004/079731 | 9/2004 |
| WO | WO 2004/079740 | 9/2004 |
| WO | WO 2004/081926 | 9/2004 |
| WO | WO 2004/093035 | 10/2004 |
| WO | WO 2004/100155 | 11/2004 |
| WO | WO 2004/100156 | 11/2004 |
| WO | WO 2005/004123 | 1/2005 |
| WO | WO 2005/004154 | 1/2005 |

OTHER PUBLICATIONS

International Search Report, dated Aug. 25, 2004.
Second Official Communication issued by the Indian Patent Office on Sep. 26, 2007 in a corresponding Indian Patent Application.
Office Action dated Jan. 7, 2008 for corresponding European Application No. 03 816 086.7-2210.
Office Action dated Jan. 7, 2008 for corresponding European Application No. 03 816 266.5-2210.
"JIS Handbook Data Processing for Hardware," Japanese Standards Association Inc., Japan, Apr. 21, 1999, pp. 1064-1070.
International Search Report and Written Opinion dated Jan. 13, 2006.
International Search Report and Written Opinion dated Mar. 8, 2007.
International Search Report and Written Opinion dated Aug. 31, 2004.
Russian Office Action dated Jun. 26, 2008.
European Search Report dated Jun. 5, 2008.
Japanese Office Action dated Feb. 6, 2009.
Japanese Office Action dated Feb. 20, 2009.

ECMA: "ECMA 238 Data interchange on 130mm optical disks of type WORM using irreversible effects—capacity 2, 6 Gbytes per cartridge" Internet Citation, [Online] Jun. 1996, XP002289010 Retrieved from the Internet: URL: http://www.ecma-international.org> [retrieved on Jul. 20, 2004].

European Office Action dated Jul. 16, 2009.
European Office Action dated Jun. 22, 2009.
Japanese Office Action dated Jul. 24, 2009 with English translation.

* cited by examiner

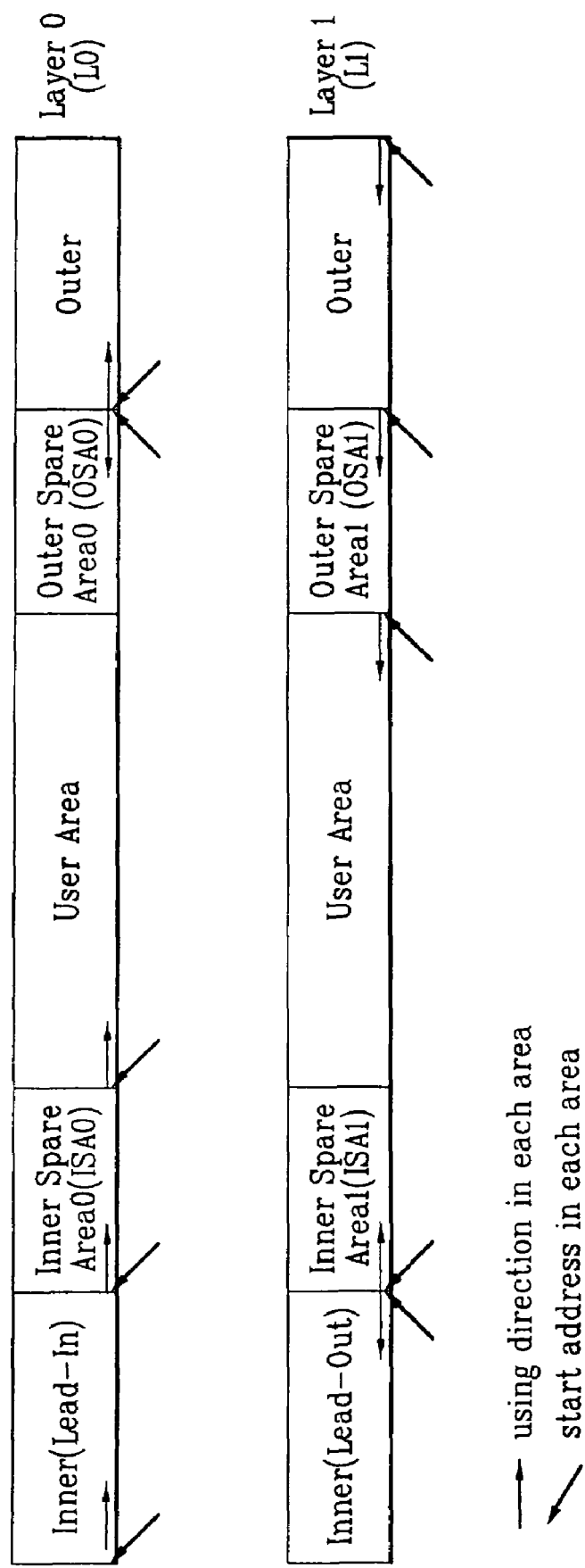

FIG. 4B

| | contents | Number of Bytes |
|---|---|---|
| SBM Header | Un-allocated Space Bitmap Identifier = "UB" | 2 |
| | Format Version = 00h | 1 |
| | Reserved, 00h | 1 |
| | Layer Number (0 or 1) | 4 |
| | Reserved, 00h | R |
| SBM Info | SBM for inner Area | |
| |    Start Cluster First PSN | 4 |
| |    Length in inner area | 4 |
| |    Bitmap Data | M |
| |    Reserved, 00h | 4 |
| | SBM for inner spare Area | |
| |    Start Cluster First PSN | 4 |
| |    Length in inner spare area | 4 |
| |    Bitmap Data | N |
| |    Reserved, 00h | 4 |
| | SBM for User Area | |
| |    Start Cluster First PSN | 4 |
| |    Length in user area | 4 |
| |    Bitmap Data | O |
| |    Reserved, 00h | 4 |
| | SBM for outer spare Area | |
| |    Start Cluster First PSN | 4 |
| |    Length in outer spare area | 4 |
| |    Bitmap Data | P |
| |    Reserved, 00h | 4 |
| | SBM for Outer Area | |
| |    Start Cluster First PSN | 4 |
| |    Length in outer area | 4 |
| |    Bitmap Data | Q |
| |    Reserved, 00h | 4 |
| SBM Terminator | | |

US 7,675,828 B2

RECORDING MEDIUM HAVING DATA STRUCTURE FOR MANAGING AT LEAST A DATA AREA OF THE RECORDING MEDIUM AND RECORDING AND REPRODUCING METHODS AND APPARATUSES

FOREIGN PRIORITY

The present invention claims priority under 35 U.S.C. 119 on Korean Application Nos. 10-2003-010829 filed on Feb. 25, 2003 and 10-2003-010830 filed on Feb. 25, 2003 and 10-2003-015634 filed on Mar. 13, 2003; the contents of which are incorporated by reference in their entirety.

BACKGROUND OF THE INVENTION

1. Field of the Invention

The present invention relates to a recording medium having a data structure for managing at least a data area of the recording medium as well as methods and apparatuses for reproduction and recording.

2. Description of the Related Art

The standardization of new high-density read only and rewriteable optical disks capable of recording large amounts of data has been progressing rapidly and new optical disk related products are expected to be commercially available in the near future. For example, the blu-ray disc (BD), which belongs to the next-generation HD-DVD technology, is the next-generation optical recording solution that can strikingly surpass the data recording capability of existing DVDs.

Recording on and reading from a BD uses a celadon laser having a wavelength of 405 nm, which is much denser than a red laser having a wavelength of 650 nm used with existing DVDs. Thus, a greater amount of data may be stored on BD than on existing DVDs.

While at least one standard related to the BD (Blu-ray Disc) has been developed, such as BD-RE (BD Rewritable disc), many other standards such as BD-WO (BD Write Once disc) are still in development. Standards such as BD-RE provide a data structure for managing defects in the data area of the recording medium. However, the BD-WO, because of its write-once nature, presents challenges not faced by existing BD standards such as BD-RE, and an effective data structure and method of managing defects is still under development for the BD-WO standard.

SUMMARY OF THE INVENTION

The recording medium according to the present invention includes a data structure for managing at least a data area of the recording medium.

In one exemplary embodiment, a temporary defect management area of the recording medium stores a first data block that includes a space bit map and a temporary definition structure. The space bit map indicates recordation status of the data area, and the temporary definition structure provides a first pointer to the space bit map.

The space bit map, for example, indicates the recordation status of the data area on a recording unit by recording unit basis. Here, a recording unit may be a cluster.

In another exemplary embodiment, the temporary definition structure may also provide a second pointer to a temporary defect list stored in a second data block in the temporary management area. The temporary defect list at least indicates defective portions of the data area.

In the above embodiment, the first pointer of the temporary definition structure may indicate a first physical sector number of the space bit map and the second pointer may indicate a first physical sector number of the temporary defect list. More specifically though, the first and second pointers identify a most current space bit map and a most current temporary defect list as of when the temporary definition structure is recorded.

The present invention further provides apparatuses and methods for recording and reproducing the data structure according to the present invention.

BRIEF DESCRIPTION OF THE DRAWINGS

The above features and other advantages of the present invention will be more clearly understood from the following detailed description taken in conjunction with the accompanying drawings, in which:

FIG. 3 schematically illustrates the direction in which the different areas of the optical disc are recorded;

DESCRIPTION OF THE EMBODIMENTS

In order that the invention may be fully understood, exemplary embodiments thereof will now be described with reference to the accompanying drawings.

Figure 1:
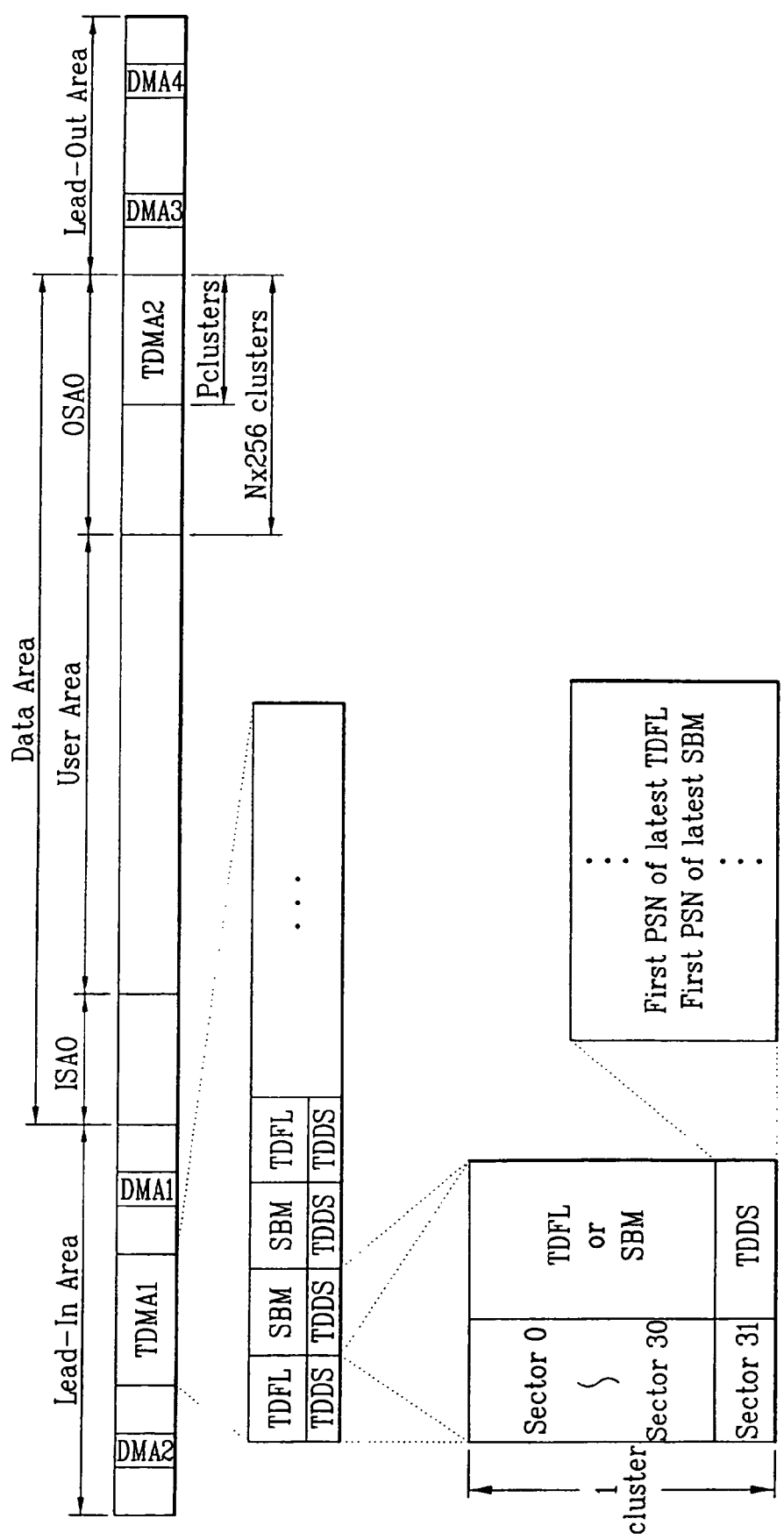
FIG. 1 illustrates a single-layer write once optical disc according to an example embodiment of the present invention.

FIG. 1 illustrates a single-layer write once optical disc according to an example embodiment of the present invention. While this and other embodiments of the present invention will be described in detail with respect to an optical disc, it will be understood that the recording medium is not limited to being an optical disk.

As shown in FIG. 1, the optical disc includes a main data area referred to as a user area for recording data. However, this user area may include defects that prohibit proper recording and/or reproduction. Accordingly, inside and outside spare areas ISA0 and OSA0 are provided to serve as replacement recording area for defect areas of the user area.

Providing such replacement areas also requires providing a data structure for managing defect replacement. As shown in FIG. 1, one or more defect management areas (DMAs) are provided for storing information to manage defect replacement, among other things, of the recording medium. In the case of a general rewritable optical disc, data can be repeatedly written in and erased from a DMA (Defect Management Area) even if the DMA has a limited size, and thus a DMA of a large size is not required. However, in the case of a write once optical disc, a once-recorded area cannot be re-used for data recording, and a management area of a larger size is required. Accordingly, the optical disc of the embodiment in FIG. 1 includes one or more TDMAs (Temporary Defect Management Areas) for managing information of the defect area. When no further recording is or can be made on the optical disc, the final TDMA information is transferred to and recorded in the DMA.

In the embodiment of FIG. 1, the TDMAs include first and second TDMAs TDMA1 and TDMA2. TDMA1 is arranged in a lead-in area of the optical disk, and has a fixed size. TDMA2 is arranged in the outside spare area OSA0, and has a size associated with a size of the outside spare area OSA0. For example, if the outside spare area OSA0 has a size of N×256 clusters, then the TDMA2 has a size P=(N*256)/4. In this example of a BD-WO, a recording unit is defined as one cluster, and one cluster is composed of 32 sectors.

The respective TDMAs may be used to store a TDFL (Temporary Defect List), a TDDS (Temporary Disc Definition Structure), and an SBM (Space Bit-Map) as data area management information. As will be described in greater detail below, the TDFL provides information for the replacement of defect areas in the data area with portions of the spare areas ISA0 and OSA0, and has a size of 1~4 clusters according to the size of the defect area list.

The SBM (Space Bitmap) provides information indicating the use or recordation status of the disc, and is applicable to the user area and/or the whole area of the disc. The SBM allocates one bit to each cluster, which is the minimum recording unit, to indicate the recording status of the associated cluster. For example, '1b' indicates the corresponding cluster is a recorded area and '0b' indicates the corresponding cluster is a non-recorded area. Accordingly, by reading the SBM information, the recording/non-recording areas of the disc may be easily recognized. Because the SBM indicates the use status of the disc even if the disc is not recorded sequentially (e.g., is recorded randomly), the SBM is used and managed if the optical disc write once is to be recorded in a random recording mode.

As will be described in greater detail below, the TDDS provides position information indicating a most current version of the TDFL and the SBM at the time the TDDS is recorded. As will be appreciated, as data is written to the optical disc and as portions of the spare areas ISA0 and OSA0 are used to replace defective areas, the TDFL, SBM and TDDS are updated (e.g., written anew in the TDMAs).

As shown in FIG. 1, the TDFL and TDDS (TDFL+TDDS) are recorded as one data block (in the case of BD-WO, at least one cluster) in a TDMA, and the SBM and TDDS (SBM+TDDS) are recorded as another data block in the TDMA. FIG. 1 shows an example where the TDFL+TDDS and SBM+TDDS are recorded in the TDMA in the unit of a cluster for respective update timings. That is, in one cluster composed of 32 sectors, the TDFL and the SBM are recorded in the 31 leading sectors sector0~sector30, and the TDDS information is recorded on the remaining sector sector31. However, it will be understood that more than one cluster may be necessary to store the respective data blocks. Even so, the TDDS is stored as the last information in the data block. The TDDS information generally includes the general management information of the disc, and because the TDDS information is recorded as the last part of the recorded area in the TDMA, the TDDS information may be easily accessed. Alternatively, a system designer may place the TDDS in as the first information in the data block to achieve the same benefits.

In this embodiment of the present invention, the position information for the TDFL and SBM provided by the TDDS is the First PSN (physical sector number) of the latest TDFL, and the First PSN of latest SBM. Accordingly, accessing the TDDS provides the position of the latest TDFL and SBM such that the present defect replacement information and recording status of the disc may be easily and efficiently determined. A first physical sector number is the address of the first leading sector in a corresponding cluster.

Figure 2:
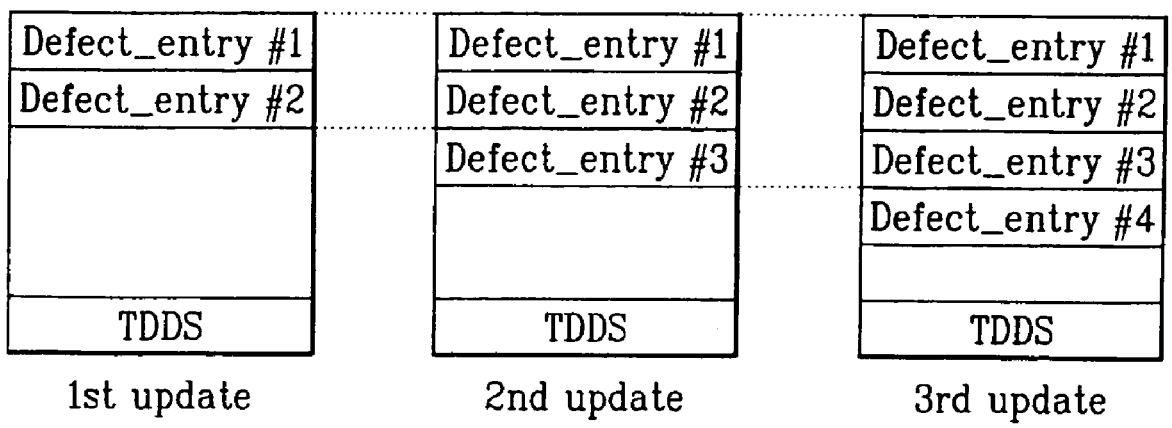
FIG. 2 shows the method of recording and updating the TDFL (temporary defect list) according to an embodiment of the present invention.

FIG. 2 shows the method of recording and updating the TDFL according to an embodiment of the present invention. FIG. 2 illustrates that two defect entries defect entry #1,#2 were recorded during a first recording of a TDFL+TDDS data block. If during a second updating, a new defect entry #3 is to be added, a new TDFL+TDDS data block, in which the TDFL includes the first, second and third defect entries # 1, #2, #3, is recorded. Similarly, if during a third updating, a new defect entry #4 is to be added, a new TDFL+TDDS data block, in which the TDFL includes the first-fourth defect entries # 1-#4, is recorded. By cumulatively recording the defect entries as described above, the defect entries of the whole disc may be accessed by accessing the latest TDFL, thereby providing convenience to the user.

As will be appreciated, with each updating of the TDFL the TDDS is updated; particularly, to indicate the new position of the TDFL.

FIG. 3 schematically illustrates the direction in which the different areas of the optical disc are recorded. This explanation will be helpful in understanding the data structure of the SBM described in detail below with respect to FIGS. 4A and 4B.

While FIG. 1 illustrated an example of a single layer optical disc, BD-WO may have a plurality of recording layers. As such aspects of the single layer optical disc according to the present invention may be applied to both layers. For the purposes of explanation, FIG. 3 schematically illustrates a plurality of layers for the respective areas in an optical disc write once, such as a BD-WO.

In the BD-WO of FIG. 3, first and second recording layers Layer0 and Layer1 (hereinafter referred to as 'L0' and 'L1') may exist. The respective recording layers include an inner area, an inner spare area, a user area, an outer spare area, and an outer area. In the case of a dual-layer disc, the inner area of the first recording layer L0 becomes the lead-in area, and the inner area of the second recording layer L1 becomes the lead-out area. However, in the case of the single-layer disc, the outer area will be the read-out area.

FIG. 3 shows that the first recording layer L0 is used from the inner periphery to the outer periphery, and only the outer spare area OSA0 thereof is used from the outer periphery to the inner periphery. The second recording layer L1 is used from the outer periphery to the inner periphery, and only the inner spare area ISA1 thereof is used from the inner periphery to the outer periphery. Accordingly, the start position of the respective area is determined according to a use direction of the area. However, this just corresponds to the use efficiency of the disc, and if the use direction of the respective area is changed, the start position of the area is also changed.

In a state that the use direction and the start position of the respective area of the disc are defined as described above, the method of indicating the SBM, which is changed according to the use status of the disc, will now be explained in detail.

Figures 4A, 4B:
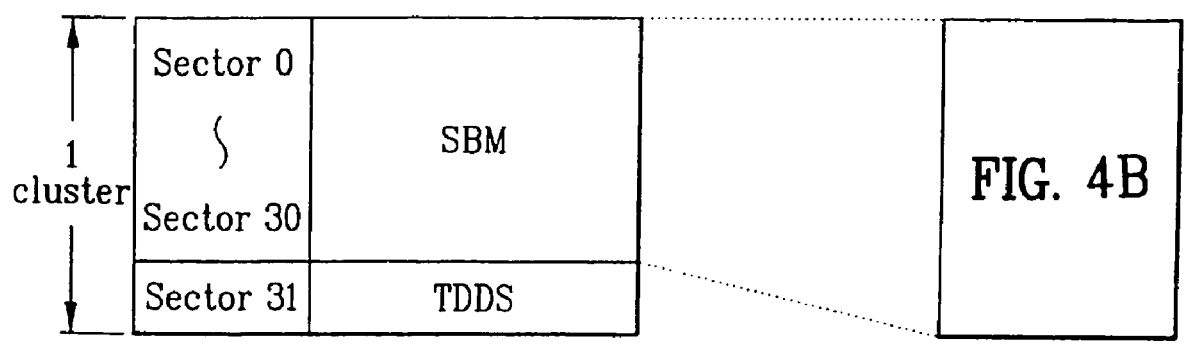
FIG. 4A illustrates the case where the SBM (space bit map) is recorded in the 31 leading sectors in a cluster, and the TDDS (temporary disc definition structure) is recorded in the remaining sector.
FIG. 4B illustrates an example of the data structure of the SBM.

FIG. 4A illustrates the case where the SBM is recorded in the 31 leading sectors in a cluster, and the TDDS is recorded in the remaining sector sector 31. FIG. 4B illustrates an example of the data structure of the SBM. As shown, the SBM includes three parts: a header for enabling recognition of the SBM, SBM information for directly indicating the SBM, and an SBM terminator for informing an end of the SBM.

The header, in addition to identifying this information field as an SBM, includes a recording layer information field and a format version field. The recording layer information field indicates which recording layer (e.g., layer number 0 or 1) the SBM is associated. The format version field indicates to which format version the SBM conforms.

The SBM information is prepared for each divided area of the disc as shown in FIG. 4B, and whether to update the SBM may be determined as needed by a user, a disc manufacturer or a host (hereinafter collectively referred to as a host). Specifically, the SBM information includes start position information (Start Cluster First PSN) of each area, length information of the corresponding area, and bitmap data for each area. In one example embodiment, the bitmap information is updated only once the start position information and the length information are set. This method is called an SBM on/off function, and is for actively coping with the diverse requests of the host. Also, in the case of the BD-WO, if the use environment corresponds to a real-time recording, defect management may not be performed. In this case, the spare area is not allocated and it is not required to update the SBM of the corresponding area.

Also, in one particular case, only the user area, which is an area where the user data is recorded, may be managed by the SBM, and the SBM will not be updated for changes to the other areas. Operating according to this embodiment is beneficial because if the SBM is updated whenever the management information is changed, frequent updates to the SBM may be required. This embodiment may prevent quickly using up the available TDMA area on the disc. Accordingly, if it is desired to perform the SBM updating of the user data area only using the SBM on/off function and not to update the remaining area, the start position information and the length information of the other areas are set to a specified value, for example, to a 'zero' value.

As will be appreciated, with each update of the SBM, a new SBM+TDDS data block is recorded in the TDMA, where the SBM provides a cumulative indication of the recordation status of the disc. As such, with each updating of the SBM, the TDDS is updated; particularly, to indicate the new position of the SBM.

Figure 5:
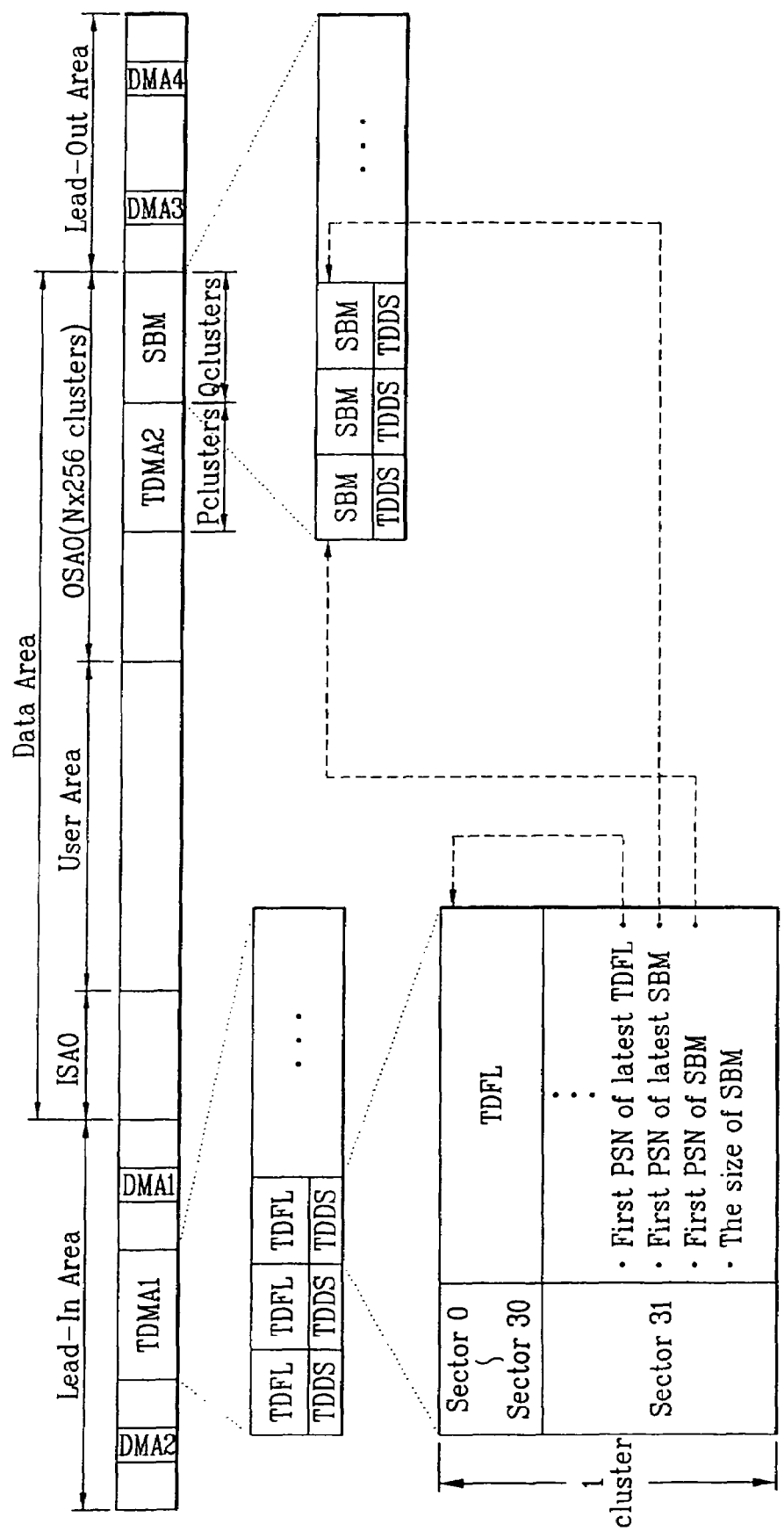
FIG. 5 illustrates another example embodiment of a single-layer write once optical disc according to the present invention.

FIG. 5 illustrates another example embodiment of a single-layer write once optical disc according to the present invention. However, as with the embodiment of FIGS. 1-4B, this embodiment may be applied to a multiple layer recording medium. In this embodiment of the present invention, an area for recording the SBM, which indicates the disc use status information, is separately provided in a specified area of the disc.

As shown, the TDMA area for recording the TDFL+TDDS data block is provided in management areas (lead-in or lead-out area) of the disc. For fixed size management areas, such at the lead-in area, the TDMA (e.g., TDMA1) has a fixed size. A TDMA (e.g., TDMA2) may also be provided in the outer spare area OSA0, which has a variable size and thus the TDMA has a variable size. Also, an area for recording the SBM is provided in a specified area of the disc, for example, in the outer spare area OSA0. In this example, the SBM area in the outer spare area OSA0 has a fixed size (that is, 9clusters). However, the SBM area may be provided in an area other than the outside spare area OSA0.

In this embodiment of the present invention, the TDFL+TDDS data block are recorded and updated in the same manner described in detail with respect to the embodiment of FIGS. 1-4B; and therefore, a detailed description thereof will not be repeated. Also, the SBM of this embodiment has the same structure as described in detail above with respect to FIG. 4B; therefore, the detailed explanation thereof will be omitted.

FIG. 5 shows the recording of SBM+TDDS in the SBM area, but the designer can freely select the recorded information and thus the recording of SBM only would come within the scope of the present invention.

In comparison to the first embodiment, this second embodiment provides additional information in the TDDS. As shown, the start position and size information of the SBM area are additionally included in the TDDS in order to manage the separately provided SBM area. The position and size information are indicated as the 'First PSN of SBM' and 'The size of SBM' information fields. In the same manner as the first embodiment, this second embodiment includes the latest TDFL and SBM position information. FIG. 5 uses arrows to demonstrate how the latest TDDS points to (e.g., provides position information for) the latest TDFL and SBM information such that the information to facilitate the management of the disc may be efficiently and easily obtained.

Figure 6:
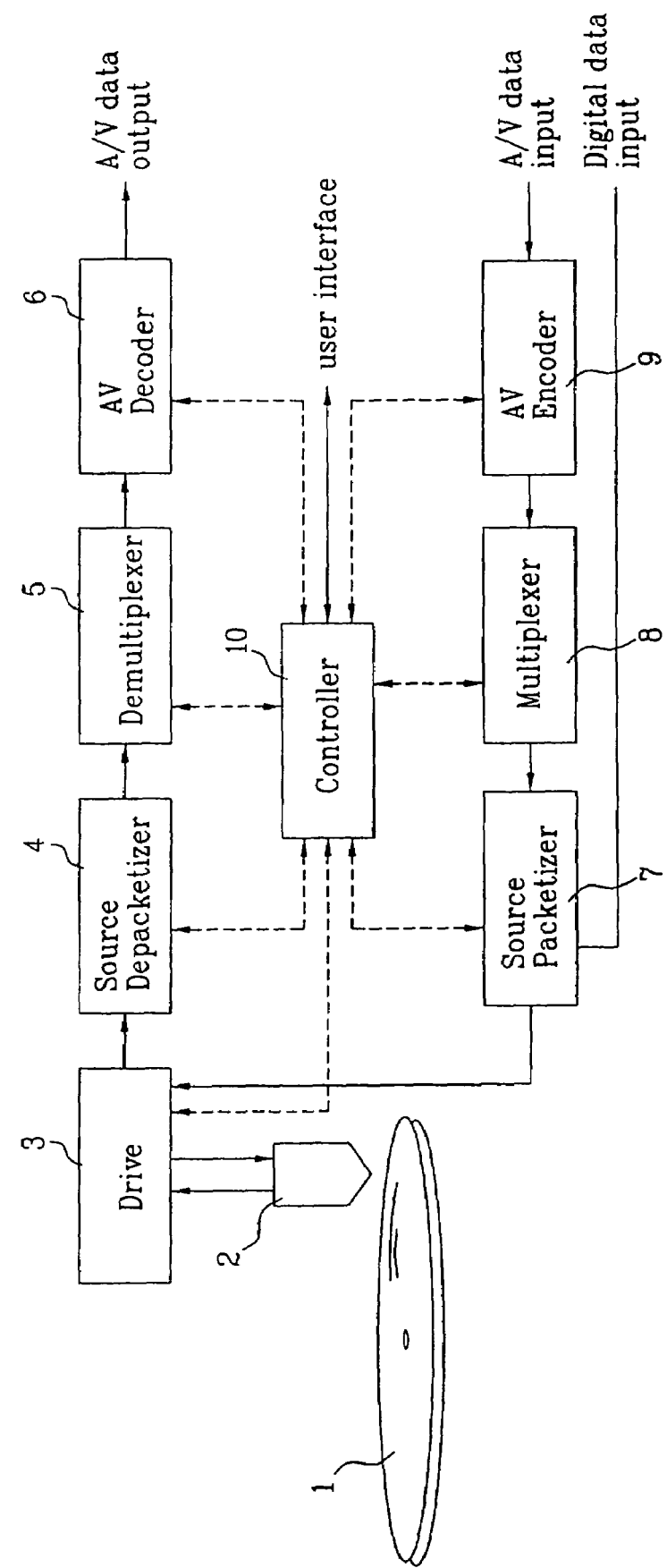
FIG. 6 illustrates an embodiment of a recording and reproducing apparatus according to the present invention.

FIG. 6 illustrates a schematic diagram of an embodiment of an optical disk recording and reproducing apparatus according to the present invention. As shown, an encoder 9 receives and encodes data (e.g., still image data, audio data, video data, etc.). The encoder 9 outputs the encoded data along with coding information and stream attribute information. A multiplexer 8 multiplexes the encoded data based on the coding information and stream attribute information to create, for example, an MPEG-2 transport stream. A source packetizer 7 packetizes the transport packets from the multiplexer 8 into source packets in accordance with the audio/video format of the optical disk. As shown in FIG. 6, the operations of the encoder 9, the multiplexer 8 and the source packetizer 7 are controlled by a controller 10. The controller 10 receives user input on the recording operation, and provides control information to encoder 9, multiplexer 8 and the source packetizer 7. For example, the controller 10 instructs the encoder 9 on the type of encoding to perform, instructs the multiplexer 8 on the transport stream to create, and instructs the source packetizer 7 on the source packet format. The controller 10 further controls a drive 3 to record the output from the source packetizer 7 on the optical disk.

The controller 10 also creates the navigation and management information for managing reproduction of the data being recorded on the optical disk. For example, the controller 10 controls the drive 3 to record one or more of the data structures of FIGS. 1-6 on the optical disk.

During reproduction or further recording operations, the controller 10 may control the drive 3 to reproduce this data structure. Based on the information contained therein, as well as user input received over the user interface (e.g., control buttons on the recording and reproducing apparatus or a remote associated with the apparatus), the controller 10 controls the drive 3 to reproduce and/or record data from/to the optical disk.

Reproduced source packets are received by a source depacketizer 4 and converted into a data stream (e.g., an MPEG-2 transport packet stream). A demultiplexer 5 demultiplexes the data stream into encoded data. A decoder 6 decodes the encoded data to produce the original data that was fed to the encoder 9. During reproduction, the controller 10 controls the operation of the source depacketizer 4, demultiplexer 5 and decoder 6. The controller 10 receives user input on the reproducing operation, and provides control information to decoder 6, demultiplexer 5 and the source packetizer 4. For example, the controller 10 instructs the decoder 9 on the type of decoding to perform, instructs the demultiplexer 5 on the transport stream to demultiplex, and instructs the source depacketizer 4 on the source packet format.

While FIG. 6 has been described as a recording and reproducing apparatus, it will be understood that only a recording or only a reproducing apparatus may be provided using those portions of FIG. 6 providing the recording or reproducing function.

The data structure for and method for managing at least a data area of a high-density recording medium in accordance with embodiments of the present invention enables an efficient and progressive use of a write-once recording medium such as BD-WO.

As apparent from the above description, the present invention provides methods and apparatuses for recording a data structure on a high density recording medium for managing at least a data area of the recording medium.

While the invention has been disclosed with respect to a limited number of embodiments, those skilled in the art, having the benefit of this disclosure, will appreciate numerous modifications and variations there from. For example, while described with respect to a Blu-ray Write-Once optical disk in several instances, the present invention is not limited to this standard of optical disk or to optical disks. It is intended that all such modifications and variations fall within the spirit and scope of the invention.

What is claimed is:

1. A computer readable medium having a data structure for managing a data area of the computer readable medium, the data area having a user area and a non-user area, the user area including a plurality of recording-units, the computer readable medium comprising:

a first management area storing a first data block including a plurality of sectors and a second data block including a plurality of sectors, the first management area being a temporary defect management area, the first data block having first information including recordation status indicating whether or not each recording unit of the user area has recorded data and the second data block having second information including a defect list, wherein respective last sectors of the first and second data blocks include third information including a first pointer pointing to an address where latest first information is recorded and a second pointer pointing to an address where latest second information is recorded; and a second management area storing a latest first data block recorded in the first management area when no further recording of user data is made on the computer readable medium, the second management area being a defect management area.

2. A method of recording management data on a recording medium, the recording medium including a data area having a user area and a non-user area, the user area including a plurality of recording-units, the method comprising:

recording a first data block including a plurality of sectors and a second data block including a plurality of sectors Into a first management area, the first management area being a temporary defect management area, the first data block having first information including recordation status indicating whether or not each recording unit of the user area has recorded data and the second data block having second information including a defect list, wherein respective last sectors of the first and second data blocks include third information including a first pointer pointing to an address where latest first information is recorded and a second pointer pointing to an address where latest second information is recorded; and recording a latest first data block recorded in the first management area into a second management area when no further recording of user data is made on the recording medium, the second management area being a defect management area.

3. A method of reproducing data from a recording medium, the recording medium including a data area having a user area and a non-user area, the user area including a plurality of recording-units, the method comprising:

reproducing at least a portion of data recorded on the recording medium based on a first data block including a plurality of sectors and a second data block including a plurality of sectors recorded in a first management area of the recording medium when further recording can be made on the recording medium, the first management area being a temporary defect management area, the first data block including first information including recordation status indicating whether or not each recording unit of the user area has recorded data and the second data block having second information including a defect list, wherein respective last sectors of the first and second data blocks include third information including a first pointer pointing to an address where latest first information is recorded and a second pointer pointing to an address where latest second information is recorded; and reproducing at least a portion of data recorded on the recording medium based on a first data block recorded in a second management area of the recording medium when no further recording can be made on the recording medium, the second management area being a defect management area, wherein the first data block recorded in the second management area is based on a latest first data block recorded in the first management area.

4. The computer readable medium of claim 1, wherein the first management area includes space to record a subsequent first data block having first information different from the first information in the first data block.

5. The computer readable medium of claim 4, wherein the first information in the subsequent first data block reflects changes in the recordation status since the first data block was recorded.

6. The method of claim 2, further comprising:

recording a subsequent first data block in the first management area, the subsequent first data block having the first information different from the first information in the first data block.

7. The method of claim 6, wherein the first information in the subsequent first data block reflects changes in the recordation status since the first data block was recorded.

8. The method of claim 3, wherein the first management area includes more than one of the first data blocks and the reproducing step reproduces based on a most recently recorded one of the first data blocks in the first management area.

9. The method of claim 8, wherein the most recently recorded one of the first data blocks includes a most current version of the first and third information.

10. The computer readable medium of claim 1, wherein only the respective last sectors of the first and second data blocks include the third information.

11. The method of claim 2, wherein only the respective last sectors of the first and second data blocks include the third information.

12. The method of claim 3, wherein only the respective last sectors of the first and second data blocks include the third information.

13. An apparatus for recording management data on a recording medium, the recording medium including a data area having a user area and a non-user area, the user area including a plurality of recording-units, the apparatus comprising:

a controller configured to control recording of a first data block including a plurality of sectors and a second data block including a plurality of sectors into a first management area, the first management area being a temporary defect management area, the first data block having first information including recordation status indicating whether or not each recording unit of the user area has recorded data and the second data block having second information including a defect list, wherein respective last sectors of the first and second data blocks include third information including a first pointer pointing to an address where latest first information is recorded and a second pointer pointing to an address where latest second information is recorded; and the controller being configured to control recording of a latest first data block recorded in the first management area into a second management area when no further recording of user data is made on the recording medium, the second management area being a defect management area.

14. The apparatus of claim 13, further comprising:

a drive configured to write the first data block into the first management area and to write the latest first data blocks into the second management area according to the control of the controller.

15. The apparatus of claim 13, wherein the controller is configured to control further recording of a defect list of a latest second data block recorded in the first management area into the second management area when no further recording of user data is made on the recording medium.

16. An apparatus for reproducing data from a recording medium, the recording medium including a data area having a user area and a non-user area, the user area including a plurality of recording-units, the apparatus comprising:

a controller configured to control reproducing at least a portion of data recorded on the recording medium based on a first data block including a plurality of sectors and a second data block including a plurality of sectors recorded in a first management area of the recording medium when further recording can be made on the recording medium, the first management area being a temporary defect management area, the first data block having first information including recordation status indicating whether or not each recording unit of the user area has recorded data and the second data block having second information including a defect list, wherein respective last sectors of the first and second data blocks include third information including a first pointer pointing to an address where latest first information is recorded and a second pointer pointing to an address where latest second information is recorded; and the controller configured to control reproducing at least a portion of data recorded on the recording medium based on a first data block recorded in a second management area of the recording medium when no further recording can be made on the recording medium, the second management area being a defect management area, wherein the first data block recorded in the second management area is based on a latest first data block recorded in the first management area.

17. The apparatus of claim 16, further comprising:

a drive configured to reproduce the first and second data blocks from the first management area and to reproduce the latest first data block from the second management area according to the control of the controller.

18. The apparatus of claim 16, wherein the controller is configured to control reproducing at least a portion of data recorded on the recording medium further based on a defect list recorded in the second management area of the recording medium when no further recording can be made on the recording medium, wherein the defect list recorded in the second management area is based on a latest second data block recorded in the first management area.

19. The computer readable medium of claim 1, wherein the second management area stores a defect list of a latest second data block recorded in the first management area when no further recording of user data is made on the computer readable medium.

20. The method of claim 2, further comprising:

recording a defect list of a latest second data block recorded in the first management area into the second management area when no further recording of user data is made on the computer readable medium.

21. The method of claim 3, further comprising:

reproducing at least a portion of data recorded on the recording medium further based on a defect list recorded in the second management area when no further recording can be made on the recording medium, wherein the defect list recorded in the second management area is based on a latest second data block recorded in the first management area.

* * * * *